United States Patent
Newstadt et al.

(10) Patent No.: US 10,609,030 B1
(45) Date of Patent: Mar. 31, 2020

(54) SYSTEMS AND METHODS FOR IDENTIFYING UNTRUSTED DEVICES IN PEER-TO-PEER COMMUNICATION

(71) Applicant: Symantec Corporation, Mountain View, CA (US)

(72) Inventors: Keith Newstadt, Newton, MA (US); Ilya Sokolov, Boston, MA (US)

(73) Assignee: CA, Inc., San Jose, CA (US)

( * ) Notice: Subject to any disclaimer, the term of this patent is extended or adjusted under 35 U.S.C. 154(b) by 273 days.

(21) Appl. No.: 15/718,562

(22) Filed: Sep. 28, 2017

(51) Int. Cl.
*H04L 29/06* (2006.01)
*H04L 29/12* (2006.01)
*H04W 12/08* (2009.01)
*H04L 29/08* (2006.01)

(52) U.S. Cl.
CPC .......... *H04L 63/10* (2013.01); *H04L 61/6022* (2013.01); *H04W 12/08* (2013.01); *H04L 67/104* (2013.01); *H04L 67/12* (2013.01)

(58) Field of Classification Search
CPC ..... H04L 63/10; H04L 12/08; H04L 61/6022; H04L 67/104; H04L 67/12; H04L 29/06; H04L 29/08; H04L 29/12
USPC .......................................................... 726/3
See application file for complete search history.

(56) References Cited

U.S. PATENT DOCUMENTS

| | | | |
|---|---|---|---|
| 2014/0161027 A1* | 6/2014 | Larue ................... | H04W 48/16 370/328 |
| 2016/0081005 A1* | 3/2016 | Patil ..................... | H04W 40/24 370/329 |

\* cited by examiner

*Primary Examiner* — Evans Desrosiers
(74) *Attorney, Agent, or Firm* — FisherBroyles, LLP

(57) ABSTRACT

The disclosed computer-implemented method for identifying untrusted devices in peer-to-peer communication may include (i) collecting first communication protocol MAC addresses and second communication protocol MAC addresses, (ii) determining which of the first communication protocol MAC addresses corresponds to which of the second communication protocol MAC addresses, and (iii) storing correlations between the first communication protocol MAC addresses and the second communication protocol MAC addresses. A correlation between a first communication protocol MAC address and a second communication protocol MAC address may indicate a single device having both addresses. The method may also include (i) detecting a communication on the second communication protocol, (ii) determining whether the detected communication is from an untrusted device, and (iii) performing a security action when the detected communication is from the untrusted device. Various other methods, systems, and computer-readable media are also disclosed.

20 Claims, 7 Drawing Sheets

SYSTEMS AND METHODS FOR IDENTIFYING UNTRUSTED DEVICES IN PEER-TO-PEER COMMUNICATION

BACKGROUND

More and more devices, such as appliances, buildings, and vehicles, are embedded with electronics, sensors, and software, with the ability to connect to networks. For example, these "smart devices," including smart appliances, lights, cameras, thermostats, etc., are able to connect to the internet or each other. This internetworking of smart devices, called the Internet of Things (IoT), allows smart devices to communicate and interact with each other. Smart devices may be able to provide status updates or data read from their sensors to other smart devices, and may further receive updates from the internet or other smart devices. For example, smart ovens and smart refrigerators may connect to a user device to provide a user with status updates, such as internal temperature. Smart thermostats may be able to control heating, ventilation, and air conditioning (HVAC) systems as well as communicate with smart lightbulbs to control lighting. Users may be able to remotely control or diagnose smart devices.

However, smart devices may be vulnerable to attack. For example, home security devices may be targeted for attack by intruders. Specifically, the smart devices' communications channels may be directly attacked. Smart devices often use peer-to-peer communication protocols, which may be directly attacked. These peer-to-peer communication protocols are often wireless, with no device between the smart devices to enforce authentication. Thus, an intruder only needs to be nearby, and can send packets directly to the smart device to send malformed requests or buffer overflows to cause the smart device to malfunction or otherwise misbehave.

The instant disclosure, therefore, identifies and addresses a need for systems and methods for identifying untrusted devices in peer-to-peer communication.

SUMMARY

As will be described in greater detail below, the instant disclosure describes various systems and methods for identifying untrusted devices in peer-to-peer communication.

In one example, a computer-implemented method for identifying untrusted devices in peer-to-peer communication may include (i) collecting, at a computing device having at least one processor, a plurality of first communication protocol media access control (MAC) addresses and a plurality of second communication protocol MAC addresses, (ii) determining which of the plurality of first communication protocol MAC addresses corresponds to which of the plurality of second communication protocol MAC addresses, (iii) storing, based on the determination, correlations between the plurality of first communication protocol MAC addresses and the plurality of second communication protocol MAC addresses, where a correlation between a first communication protocol MAC address and a second communication protocol MAC address indicates a single device associated with the first communication protocol MAC address and the second communication protocol MAC address, (iv) detecting a communication on the second communication protocol MAC address, (v) determining, based on at least the stored correlations, whether the detected communication is from an untrusted device, and (vi) performing a security action when determining the detected communication is from the untrusted device. In some embodiments, the security action may include one or more of generating a notification, activating an audible alarm, activating a visible alarm, disconnecting a device associated with the detected communication, or interfering with the detected communication.

In some examples, determining which of the plurality of first communication protocol MAC addresses corresponds to which of the plurality of second communication protocol MAC addresses may further include (i) comparing a data traffic pattern associated with one of the plurality of first communication protocol MAC addresses with a data traffic pattern associated with one of the plurality of second communication protocol MAC addresses, and (ii) determining, when the comparison satisfies a traffic similarity threshold, a correlation between the one of the plurality of first communication protocol MAC addresses and the one of the plurality of second communication protocol MAC addresses.

In other examples, the determining which of the plurality of first communication protocol MAC addresses corresponds to which of the plurality of second communication protocol MAC addresses may further include (i) comparing a location associated with one of the plurality of first communication protocol MAC addresses with a location associated with one of the plurality of second communication protocol MAC addresses, and (ii) determining, when the comparison satisfies a location similarity threshold, a correlation between the one of the plurality of first communication protocol MAC addresses and the one of the plurality of second communication protocol MAC addresses.

In some examples, the determining which of the plurality of first communication protocol MAC addresses corresponds to which of the plurality of second communication protocol MAC addresses may further include receiving, from an application running on a device associated with one of the plurality of first communication protocol MAC addresses and one of the plurality of second communication protocol MAC addresses, an indication of a correlation between the one of the plurality of first communication protocol MAC addresses and the one of the plurality of second communication protocol MAC addresses.

In some embodiments, the determining whether the detected communication is from an untrusted device may further include (i) identifying a second communication protocol MAC address of the plurality of second communication protocol MAC addresses corresponding to the detected communication, and (ii) determining, when a first communication protocol MAC address corresponding to the identified second communication protocol MAC address is unavailable, that the detected communication is from an untrusted device.

In other embodiments, the step of determining whether the detected communication is from an untrusted device may further include (i) identifying a second communication protocol MAC address of the plurality of second communication protocol MAC addresses corresponding to the detected communication, (ii) comparing a location associated with the identified second communication protocol MAC address with a location associated with a first communication protocol MAC address corresponding to the identified second communication protocol MAC address, and (iii) determining, when the comparison satisfies a location similarity threshold, that the detected communication is from a trusted device.

In some examples, the determining whether the detected communication is from an untrusted device may further include (i) identifying a second communication protocol MAC address of the plurality of second communication protocol MAC addresses corresponding to the detected communication, (ii) receiving, from an application running on a device associated with the identified second communication protocol MAC address, an indication of the detected communication, and (iii) determining, based on the indication, that the detected communication is from a trusted device.

A corresponding system for identifying untrusted devices in peer-to-peer communication may include several modules stored in memory, including (i) a collection module configured to collect a plurality of first communication protocol MAC addresses and a plurality of second communication protocol MAC addresses, (ii) a first determination module configured to determine which of the plurality of first communication protocol MAC addresses corresponds to which of the plurality of second communication protocol MAC addresses, (iii) a storing module configured to store, based on the determination, correlations between the plurality of first communication protocol MAC addresses and the plurality of second communication protocol MAC addresses, where a correlation between a first communication protocol MAC address and a second communication protocol MAC address may indicate a single device associated with the first communication protocol MAC address and the second communication protocol MAC address, (iv) a detection module configured to detect a communication on the second communication protocol MAC address, (v) a second determination module configured to determine, based on at least the stored correlations, whether the detected communication is from an untrusted device, and (vi) a security action module configured to perform a security action when determining the detected communication is from the untrusted device. In some embodiments, the system may include at least one physical processor configured to execute the collection module, the first determination module, the storing module, the detection module, the second determination module, and the security action module.

In some examples, the first determination module of the above-described system may be further configured to (i) compare a data traffic pattern associated with one of the plurality of first communication protocol MAC addresses with a data traffic pattern associated with one of the plurality of second communication protocol MAC addresses, and (ii) determine, when the comparison satisfies a traffic similarity threshold, a correlation between the one of the plurality of first communication protocol MAC addresses and the one of the plurality of second communication protocol MAC addresses. In other examples, the first determination module may be further configured to (i) compare a location associated with one of the plurality of first communication protocol MAC addresses with a location associated with one of the plurality of second communication protocol MAC addresses, and (ii) determine, when the comparison satisfies a location similarity threshold, a correlation between the one of the plurality of first communication protocol MAC addresses and the one of the plurality of second communication protocol MAC addresses.

In some embodiments, the first determination module may be further configured to receive, from an application running on a device associated with one of the plurality of first communication protocol MAC addresses and one of the plurality of second communication protocol MAC addresses, an indication of a correlation between the one of the plurality of first communication protocol MAC addresses and the one of the plurality of second communication protocol MAC addresses. In these embodiments, the second determination module may be further configured to (i) identify a second communication protocol MAC address of the plurality of second communication protocol MAC addresses corresponding to the detected communication, wherein the identified second communication protocol MAC address is associated with the device, (ii) receive, from the application running on the device, an indication of the detected communication, and (iii) determine, based on the indication, that the detected communication is from a trusted device.

In some embodiments, the second determination module may be further configured to (i) identify a second communication protocol MAC address of the plurality of second communication protocol MAC addresses corresponding to the detected communication, and (ii) determine, when a first communication protocol MAC address corresponding to the identified second communication protocol MAC address is unavailable, that the detected communication is from an untrusted device. In other embodiments, the second determination module may be further configured to (i) identify a second communication protocol MAC address of the plurality of second communication protocol MAC addresses corresponding to the detected communication, (ii) compare a location associated with the identified second communication protocol MAC address with a location associated with a first communication protocol MAC address corresponding to the identified second communication protocol MAC address, and (iii) determine, when the comparison satisfies a location similarity threshold, that the detected communication is from a trusted device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) collect, at the computing device, a plurality of first communication protocol MAC addresses and a plurality of second communication protocol MAC addresses, (ii) determine which of the plurality of first communication protocol MAC addresses corresponds to which of the plurality of second communication protocol MAC addresses, (iii) store, based on the determination, correlations between the plurality of first communication protocol MAC addresses and the plurality of second communication protocol MAC addresses where a correlation between a first communication protocol MAC address and a second communication protocol MAC address may indicate a single device associated with the first communication protocol MAC address and the second communication protocol MAC address, (iv) detect a communication on the second communication protocol, (v) determine, based on at least the stored correlations, whether the detected communication is from an untrusted device, and (vi) perform a security action when determining the detected communication is from the untrusted device.

In some examples, the instructions for determining which of the plurality of first communication protocol MAC addresses corresponds to which of the plurality of second communication protocol MAC addresses may further include (i) comparing a data traffic pattern associated with one of the plurality of first communication protocol MAC addresses with a data traffic pattern associated with one of the plurality of second communication protocol MAC addresses, and (ii) determining, when the comparison satisfies a traffic similarity threshold, a correlation between the one of the plurality of first communication protocol MAC addresses and the one of the plurality of second communication protocol MAC addresses. In other examples, the instructions for determining which of the plurality of first communication protocol MAC addresses corresponds to which of the plurality of second communication protocol MAC addresses may further include (i) comparing a location associated with one of the plurality of first communication protocol MAC addresses with a location associated with one of the plurality of second communication protocol MAC addresses, and (ii) determining, when the comparison satisfies a location similarity threshold, a correlation between the one of the plurality of first communication protocol MAC addresses and the one of the plurality of second communication protocol MAC addresses.

In some embodiments, the instructions for determining which of the plurality of first communication protocol MAC addresses corresponds to which of the plurality of second communication protocol MAC addresses may further include receiving, from an application running on a device associated with one of the plurality of first communication protocol MAC addresses and one of the plurality of second communication protocol MAC addresses, an indication of a correlation between the one of the plurality of first communication protocol MAC addresses and the one of the plurality of second communication protocol MAC addresses. In these embodiments, the instructions for determining whether the detected communication is from an untrusted device may further include (i) identifying a second communication protocol MAC address of the plurality of second communication protocol MAC addresses corresponding to the detected communication, wherein the identified second communication protocol MAC address is associated with the device, (ii) receiving, from the application running on the device, an indication of the detected communication, and (iii) determining, based on the indication, that the detected communication is from a trusted device.

In some examples, the instructions for determining whether the detected communication is from an untrusted device may further include (i) identifying a second communication protocol MAC address of the plurality of second communication protocol MAC addresses corresponding to the detected communication, and (ii) determining, when a first communication protocol MAC address corresponding to the identified second communication protocol MAC address is unavailable, that the detected communication is from an untrusted device. In other examples, the instructions for determining whether the detected communication is from an untrusted device further include (i) identifying a second communication protocol MAC address of the plurality of second communication protocol MAC addresses corresponding to the detected communication, (ii) comparing a location associated with the identified second communication protocol MAC address with a location associated with a first communication protocol MAC address corresponding to the identified second communication protocol MAC address, and (iii) determining, when the comparison satisfies a location similarity threshold, that the detected communication is from a trusted device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
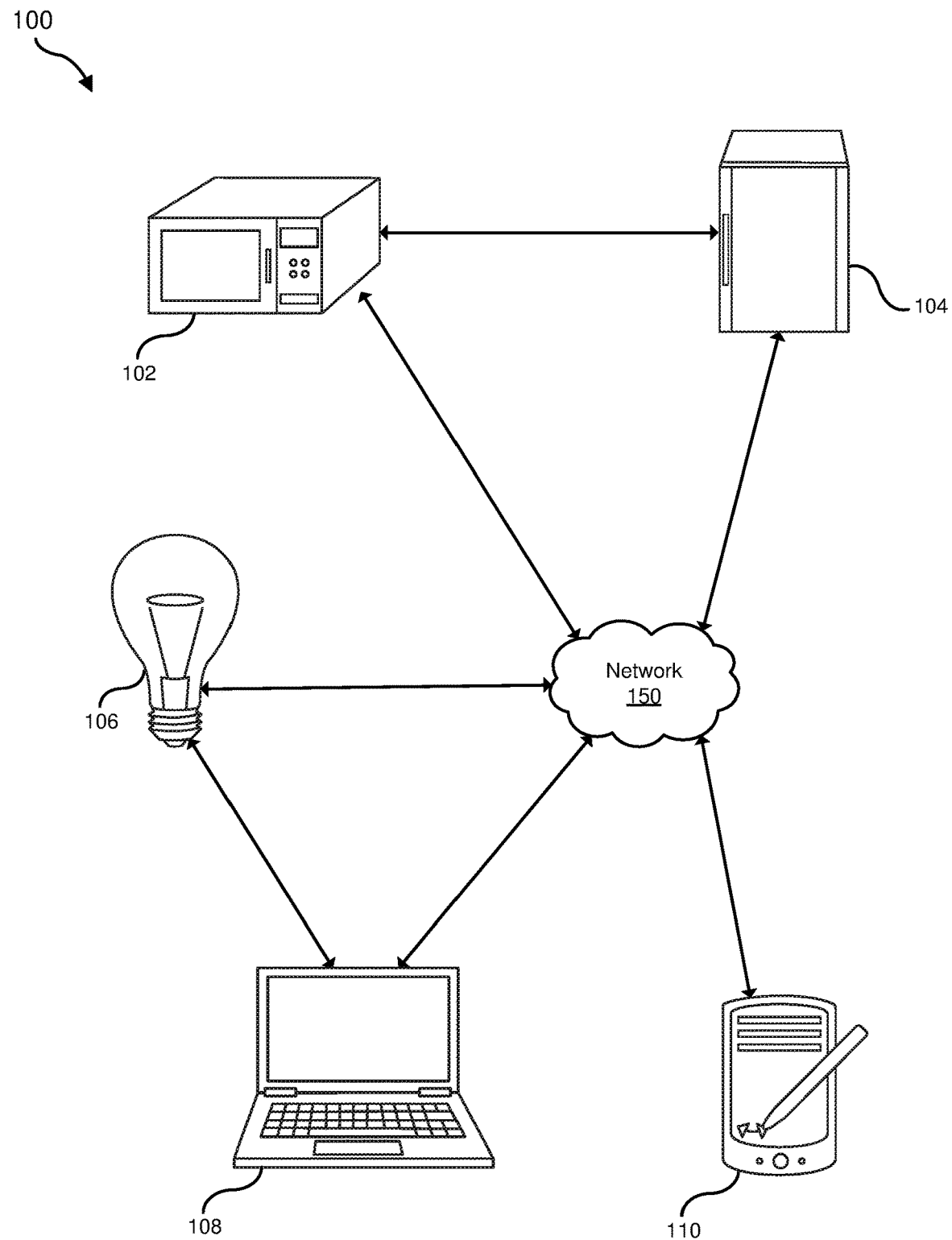
FIG. 1 is a diagram of an example system for identifying untrusted devices in peer-to-peer communication.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying untrusted devices in peer-to-peer communication. As will be explained in greater detail below, by comparing activity of a MAC address of a first communication protocol against activity of a MAC address of a second communication protocol, the systems and methods described herein may be able to link together a device's MAC addresses for the first and second communication protocols. A MAC address may be a unique identifier corresponding to a network interface of a device. Because different communication protocols may require different hardware to adhere to the communication protocol, a device may have a MAC address for each communication protocol the device may connect to. When the device's MAC address for the second communication protocol is detected on a communication on the second protocol, the presence of the device's MAC address for the first communication protocol may indicate that the device, rather than a spoofed device or other attacker, is initiating the communication. Thus, the device can be verified as a trusted device for communications on the second protocol.

Figure 2:
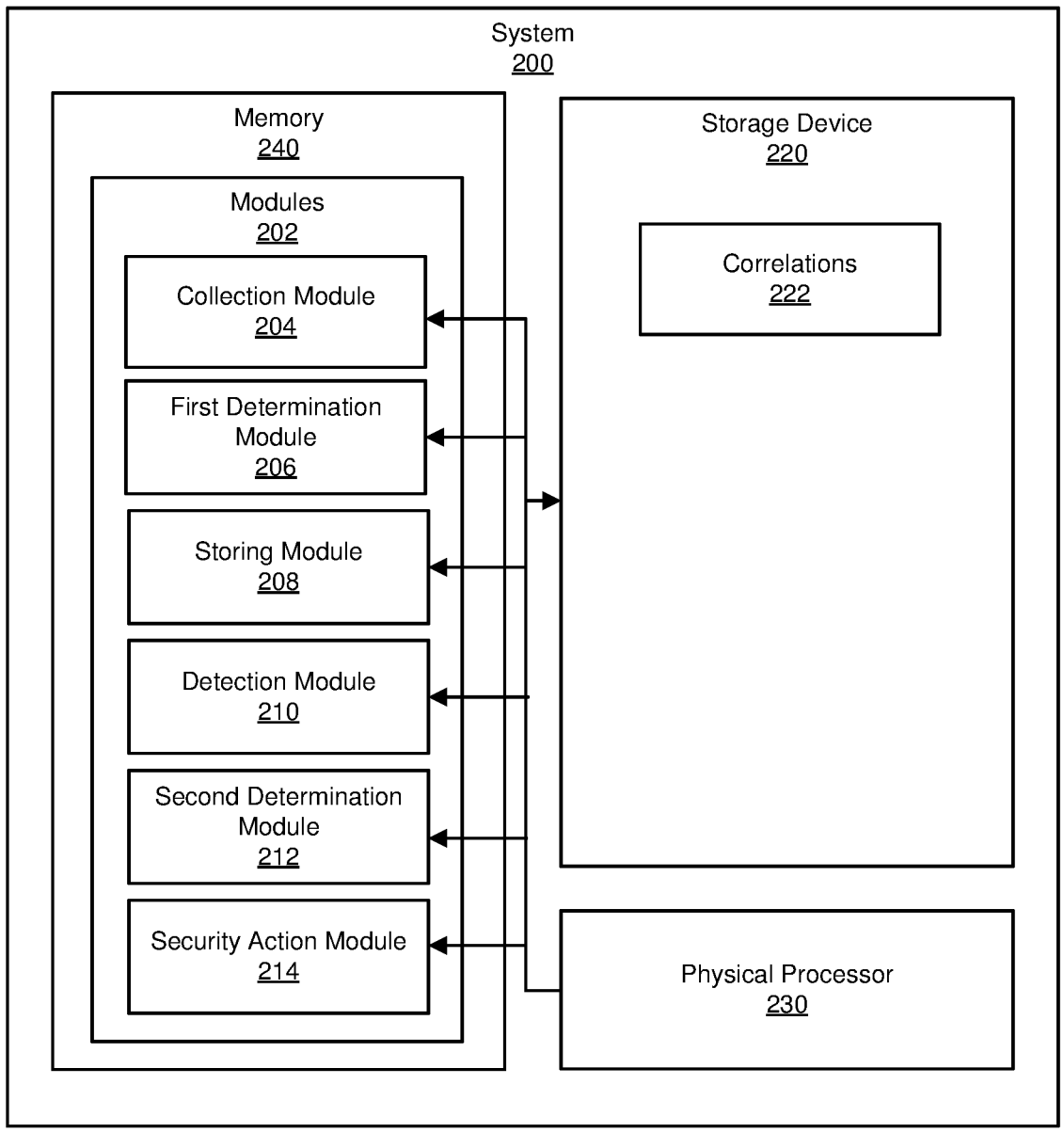
FIG. 2 is a block diagram of an example system for identifying untrusted devices in peer-to-peer communication.
Figure 3:
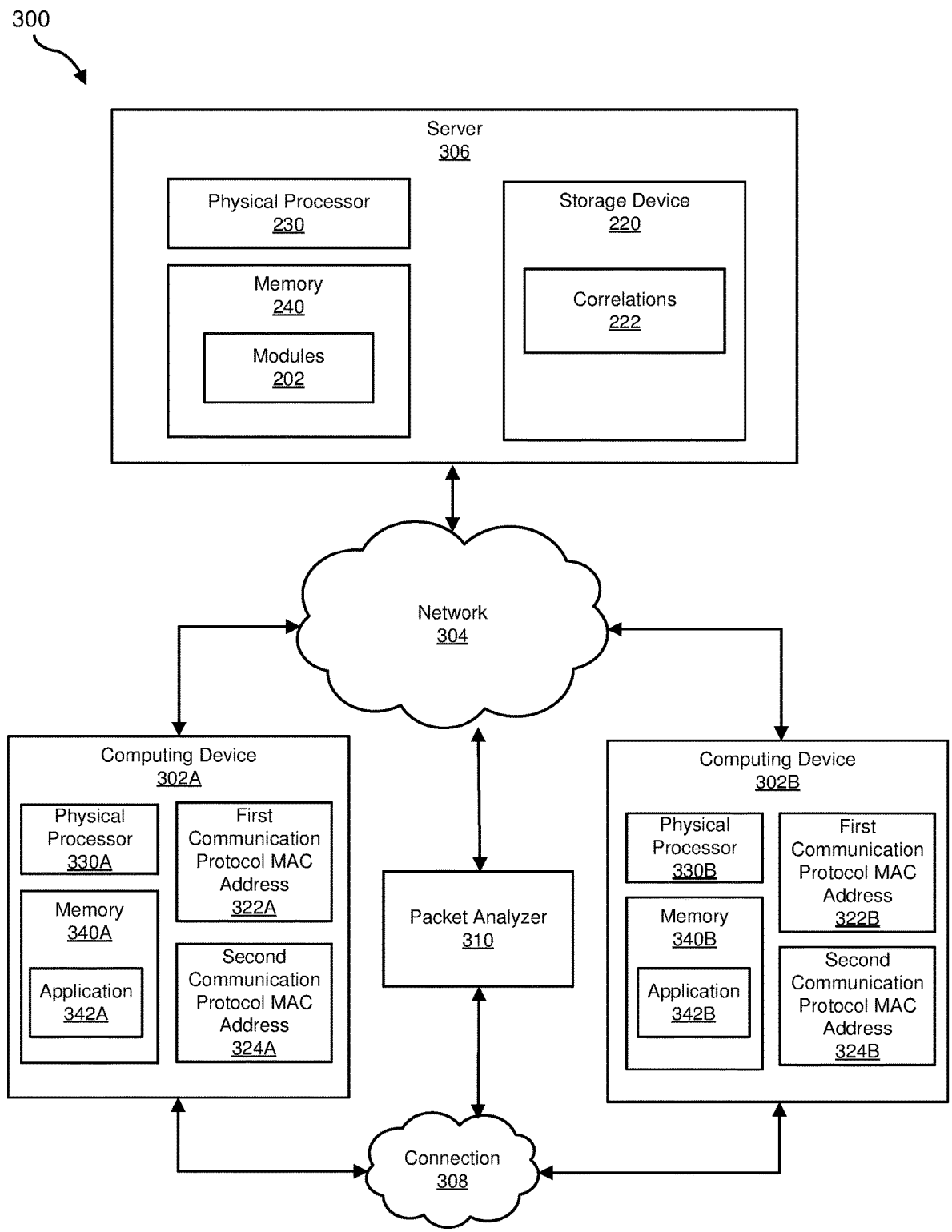
FIG. 3 is a block diagram of an additional example system for identifying untrusted devices in peer-to-peer communication.

The following will provide, with reference to FIGS. 1-3, detailed descriptions of example systems for identifying untrusted devices in peer-to-peer communication. Detailed descriptions of corresponding computer-implemented methods will also be provided in connection with FIG. 4. Detailed descriptions of example communications will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a diagram of an example IoT environment 100 for identifying untrusted devices in peer-to-peer communication. IoT environment 100 may include IoT devices such as a microwave oven 102, a refrigerator 104, a light 106, as well as computing devices such as a laptop 108, a tablet 110, and a network 150. Microwave oven 102, refrigerator 104, and light 106 may be smart devices, each including its own processor, sensors, and network interfaces. Network 150 may be a wireless network that is connected to the internet. IoT environment 100 may cover a limited geographic area, such as a room, a floor, a house, a building, etc.

Microwave oven 102, refrigerator 104, light 106, laptop 108, and tablet 110 may be connected to network 150. Network 150, which corresponds to a first communication protocol, may be a secure network protocol, such as WiFi, which has an authorization process for devices to join. Microwave oven 102, refrigerator 104, light 106, laptop 108, and tablet 110 may be connected to each other through network 150. Microwave oven 102, refrigerator 104, light 106, laptop 108, and tablet 110 may be connected to each other through a second communication protocol, which may be a peer-to-peer protocol such as BLUETOOTH. In FIG. 1, microwave oven 102 may be connected to refrigerator 104 through the second communication protocol, and light 106 may be connected to laptop 108 through the second communication protocol.

An intruder may attempt to connect with an IoT device through the second communication protocol to control or disable the IoT device. The second communication protocol may be a peer-to-peer protocol and may be vulnerable to peer-to-peer attacks because there is no device in the middle to enforce authenticated access to a network. For example, the intruder may connect directly to light 106 in order to disable it. The intruder may spoof the MAC address of laptop 108 to appear as laptop 108 to light 106.

FIG. 2 is a block diagram of an example system 200 for identifying untrusted devices in peer-to-peer communication. As illustrated in this figure, system 200 may include one or more modules 202 for performing one or more tasks. As will be explained in greater detail below, modules 202 may include a collection module 204, a first determination module 206, a storing module 208, a detection module 210, a second determination module 212, and a security action module 214. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing device 302A, computing device 302B, and/or server 306). One or more of modules 202 in FIG. 2 may also represent all or portions of one or more special-purpose computers configured to perform one or more tasks.

As illustrated in FIG. 2, system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate identifying untrusted devices in peer-to-peer communication. Examples of physical processor 230 may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, system 200 may also include one or more storage devices, such as storage device 220. Storage device 220 generally represents any type or form of storage device or medium capable of storing data and/or other computer-readable instructions. In one example, storage device 220 may store correlations 222. Correlations 222 may include correlations between MAC addresses of a first communication protocol and a second communication protocol, as will be further described below.

System 200 in FIG. 2 may be implemented in a variety of ways. For example, all or a portion of system 200 may represent portions of example system 300 in FIG. 3. As shown in FIG. 3, system 300 may include a computing device 302A in communication with a server 306 via a network 304. System 300 may include a computing device 302B in communication with server 306 via network 304. Computing device 302A may be in communication with computing device 302B via a connection 308. System 300 may include a packet analyzer 310 in communication with server 306 via network 304, and capable of capturing traffic on network 304 and connection 308. In one example, all or a portion of the functionality of modules 202 may be performed by computing device 302A, computing device 302B, server 306, packet analyzer 310, and/or any other suitable computing system. As will be described in greater detail below, one or more of modules 202 from FIG. 2 may, when executed by at least one processor of computing device 302A, computing device 302B, packet analyzer 310, and/or server 306, enable computing device 302A, computing device 302B, packet analyzer 310 and/or server 306 to identify untrusted devices in peer-to-peer communications. For example, and as will be described in greater detail below, one or more of modules 202 may cause computing device 302A, computing device 302B, packet analyzer 310 and/or server 306 to recite steps of the methods described in FIG. 4.

Computing device 302A generally represents any type or form of computing device capable of reading computer-executable instructions. For example, computing device 302A may be a smartphone. Additional examples of computing device 302A may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, IoT devices (e.g., smart appliances, etc.), variations or combinations of one or more of the same, and/or any other suitable computing device. Computing device 302A may include a physical processor 330A, a memory 340A including an application 342A, a first communication protocol MAC address 322A, and a second communication protocol MAC address 324A. Physical processor 330A generally represents any type or form of hardware-implemented processing unit capable of interpreting and/or executing computer-readable instructions. In one example, physical processor 330A may execute the application 342A stored in memory 340A. First communication protocol MAC address 322A is a MAC address which may identify computing device 302A on network 304. Second communication protocol MAC address 324A is a MAC address which may identify computing device 302A on connection 308.

Computing device 302B generally represents any type or form of computing device capable of reading computer-executable instructions. For example, computing device 302B may be a smart appliance. Additional examples of computing device 302B may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, IoT devices, variations or combinations of one or more of the same, and/or any other suitable computing device. Computing device 302B may include a physical processor 330B, a memory 340B including an application 342B, a first communication protocol MAC address 322B, and a second communication protocol MAC address 324B. Physical processor 330B generally represents any type or form of hardware-implemented processing unit capable of interpreting and/or executing computer-readable instructions. In one example, physical processor 330B may execute application 342B stored in memory 340B. First communication protocol MAC address 322B is a MAC address which may identify computing device 302B on the network 304. Second communication protocol MAC address 324B is a MAC address which may identify computing device 302B on connection 308.

Server 306 generally represents any type or form of computing device that is capable of receiving, processing, storing, and sending data. Server 306 may be a private web server. Additional examples of server 306 include, without limitation, security servers, application servers, web servers, storage servers, and/or database servers configured to run certain software applications and/or provide various security, web, storage, and/or database services. Although illustrated as a single entity in FIG. 3, server 306 may include and/or represent a plurality of servers that work and/or operate in conjunction with one another.

Network 304 generally represents any medium or architecture capable of facilitating communication or data transfer. In one example, network 304 may facilitate communication between computing device 302A, computing device 302B, and server 306. In this example, network 304 may facilitate communication or data transfer using wireless connections. Network 304 may be a secure wireless network protocol such as WiFi. Other examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Connection 308 generally represents any medium or architecture capable of facilitating communication or data transfer. In one example, connection 308 may facilitate communication between computing device 302A and computing device 302B. In this example, connection 308 may facilitate communication or data transfer using wireless connections. The connection 308 may be a peer-to-peer protocol such as BLUETOOTH. Other examples of connection 308 may include, without limitation, a short-range wireless communication, an intranet, a WAN, a LAN, a PAN, the Internet, PLC, a cellular network, portions of one or more of the same, variations or combinations of one or more of the same, and/or any other suitable network. In addition, although FIG. 3 depicts a single connection 308, there may be multiple connections 308 for each pairing of computing devices such that each connection 308 is not shared by more than two computing devices.

Packet Analyzer 310 generally represents any type or form of computing device capable of reading computer-executable instructions and capturing data packets on one or more communication protocols, such as a packet sniffer. For example, packet analyzer 310 may be a WiFi extender, or a program running on a computing device such as the computing device 302A. Additional examples of packet analyzer 310 may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, IoT devices, variations or combinations of one or more of the same, and/or any other suitable computing device. When computing devices communicate, data may be transmitted in packets, which may include a header portion and a data portion. Packet analyzer 310 may be capable of capturing packets within its wireless range, which may cover IoT environment 100.

In certain implementations, packet analyzer 310 may be integrated in part or in whole with server 306. For example, packet analyzer 310 and portions of server 306 may be implemented as a WiFi extender capable of capturing data packets on network 304 and connection 308, determining correlations between MAC addresses on network 304 and connection 308, identify untrusted devices on at least connection 308, and initiate security actions in response to detecting untrusted devices.

Figure 4:
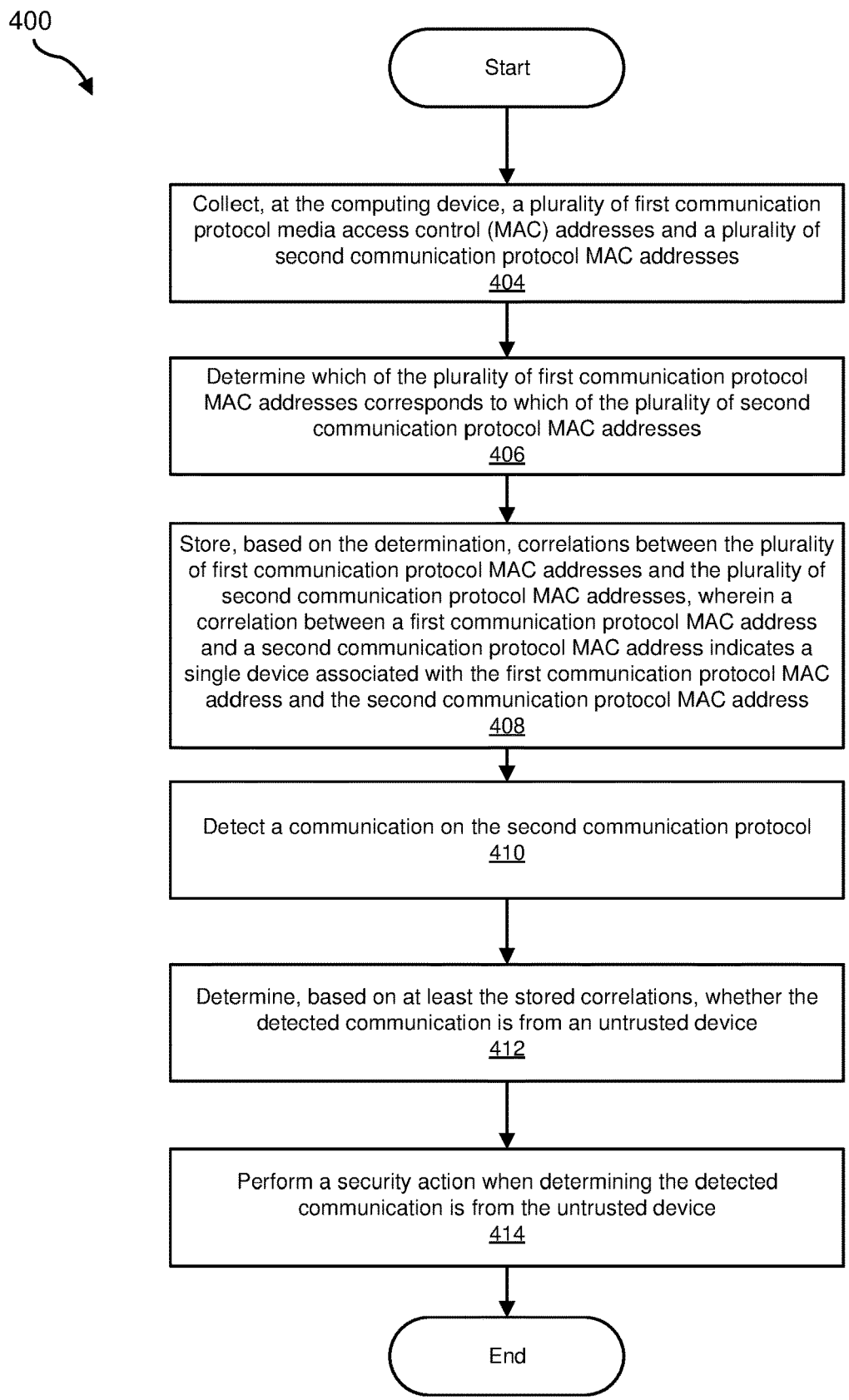
FIG. 4 is a flow diagram of an example method for identifying untrusted devices in peer-to-peer communication.

FIG. 4 is a flow diagram of an example computer-implemented method 400 for identifying untrusted devices in peer-to-peer communication. The steps shown in FIG. 4 may be performed by any suitable computer-executable code and/or computing system, including system 200 in FIG. 2, system 300 in FIG. 3, and/or variations or combinations of one or more of the same. In one example, each of the steps shown in FIG. 4 may represent an algorithm whose structure includes and/or is represented by multiple sub-steps, examples of which will be provided in greater detail below. The communications exchanged throughout method 400 are diagrammed in communication chart 500 of FIG. 5.

As illustrated in FIG. 4, at step 404 one or more of the systems described herein may collect a plurality of first communication protocol MAC addresses and a plurality of second communication protocol MAC addresses. For example, collection module 204 may, as part of packet analyzer 310 in FIG. 3, capture data packets from network 304 and connection 308. The captured data packets may be recorded, or a portion of the captured data packets, such as the headers, may be captured. Capturing the data packets may not significantly affect or slow down the data traffic on network 304 and connection 308. The first communication protocol may correspond to network 304, which may be a secure wireless network protocol such as WiFi, which requires devices to be authenticated before joining the secure wireless network protocol. The second communication protocol may correspond to connection 308, which may be a peer-to-peer communication protocol which does not have an authentication process as robust as that of the secure wireless network protocol. In some implementations, the first communication protocol may be WiFi, and the second communication protocol may be BLUETOOTH, although in other implementations the communication protocols may refer to other wired or wireless communication protocols.

Collection module 204 may extract first communication MAC addresses from data packets captured from network 304, and extract second communication MAC addresses from data packets captured from connection 308. Collection module 204 may detect every connection 380 and may further detect when a new connection 308 is initiated to accordingly capture data packets.

Figure 5:
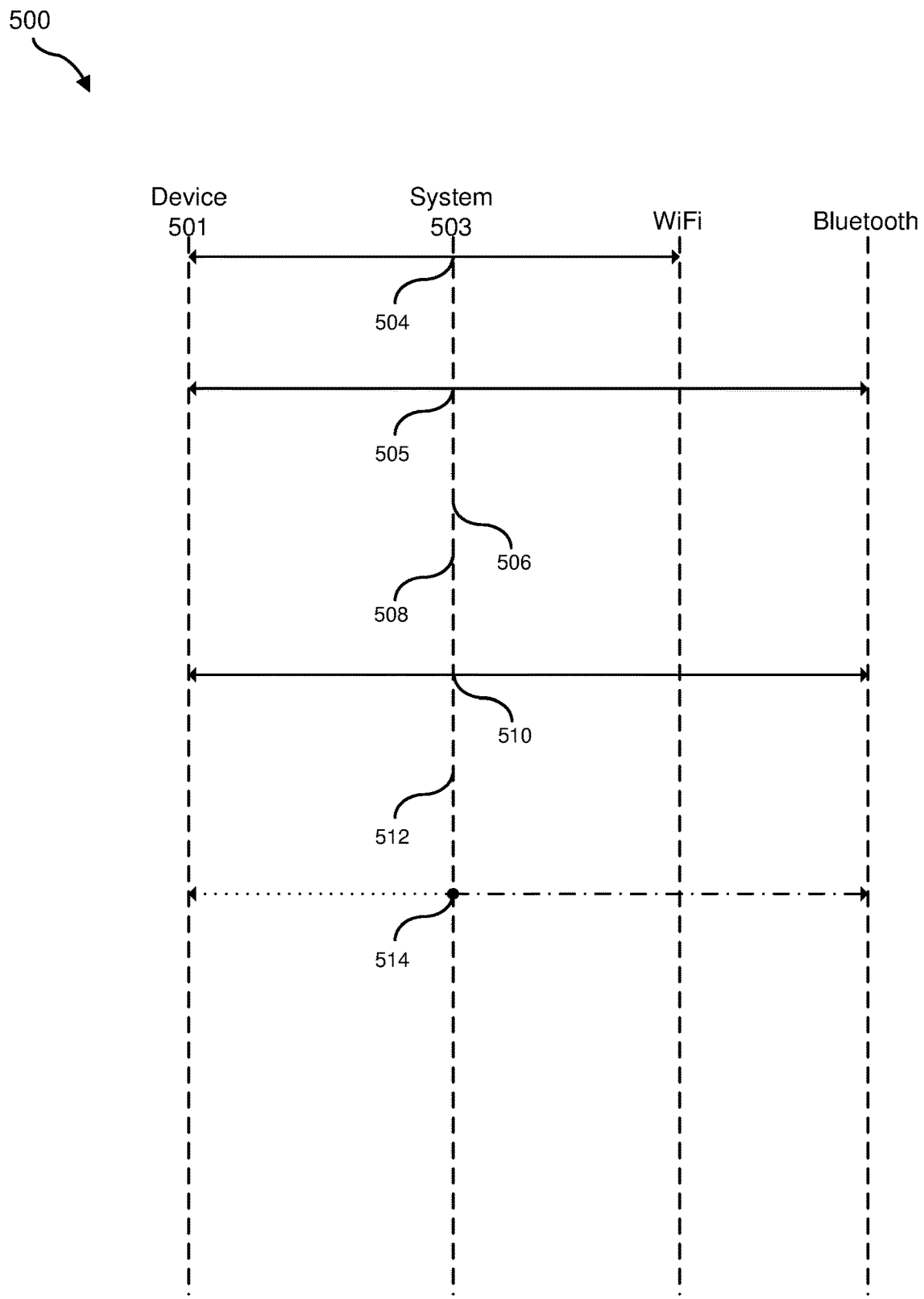
FIG. 5 is a communication chart for an example system performing the example method of FIG. 4.

In FIG. 5, the communication chart 500 shows communications of a device 501, which may be the computing device 302A or the computing device 302B, on WiFi, corresponding to the first communication protocol, and on Bluetooth, corresponding to the second communication protocol. FIG. 5 also shows a system 503, which may be the packet analyzer 310 and/or the server 306. At 504, the system 503 detects WiFi network traffic associated with the device 501, and may extract a WiFi MAC address of the device 501. At 505, the system 503 detects Bluetooth traffic associated with the device 501, and may extract a Bluetooth MAC address of the device 501. The MAC addresses may be extracted, for instance, from headers of the captured data packets.

Returning to FIG. 4, at step 406, one or more of the systems described herein may determine which of the plurality of first communication protocol MAC addresses corresponds to which of the plurality of second communication protocol MAC addresses. For example, first determination module 206 may, as part of packet analyzer 310 and/or server 306 in FIG. 3, may find correlations between MAC addresses in one or more ways.

The first determination module 206 may compare a data traffic pattern associated with a WiFi MAC address with a data traffic pattern associated with a Bluetooth MAC address. If the WiFi data traffic pattern satisfies a traffic similarity threshold with the Bluetooth data traffic pattern, the first determination module 206 may determine that the WiFi MAC address and the Bluetooth MAC address correspond to the same single device. For example, if the device is a smartphone streaming music to a Bluetooth speaker, the first determination module 206 may detect WiFi data streaming to the smartphone, and similar data streaming to the Bluetooth speaker, and determine that the WiFi MAC address receiving the streaming data corresponds to the same device as the Bluetooth MAC address sending the streaming data. The traffic similarity threshold may be a threshold percentage similarity, such as 99%, of data traffic patterns. Data traffic patterns may include an amount of data, type of data, actual data, or other data features.

The first determination module 206 may compare a location associated with a WiFi MAC address with a location associated with a Bluetooth MAC address. If the comparison satisfies a location similarity threshold, which may be a distance threshold such as one foot, the first determination module 206 may determine that the WiFi MAC address corresponds to the same device as the Bluetooth MAC address. The comparison may further include a time threshold, such as 1 second, for determining that the WiFi MAC address and the Bluetooth MAC address are communicating at approximately the same time if the time threshold is satisfied. For example, a smart oven may be connected to an internet server through WiFi and also connected to another smart device through Bluetooth, the first determination module 206 may detect the WiFi MAC address and the Bluetooth MAC address communicating at approximately the same time and approximately the same location and determine that the MAC addresses correspond to the same device. In other words, if the WiFi MAC address and the Bluetooth MAC address are not in the same approximate location when they are communicating at approximately the same time, the WiFi MAC address and the Bluetooth MAC address may refer to two different devices. The location may be determined from WiFi triangulation, GPS coordinates provided by the computing device 302A (such as from the application 342A), or other methods of determining location. The communication times may be determined from timestamps extracted from packet headers, timestamps associated with when the packet analyzer 310 intercepted the packets, or other methods.

In certain implementations, an application or app, such as the application 342A running on the computing device 302A or the application 342B running on the computing device 302B, may provide the first determination module 206 with the appropriate corresponding MAC addresses. For instance, the application 342A may have access to the first communication protocol MAC address 322A and the second communication protocol MAC address 324A, and send an indication to the first determination module 206 that the first communication protocol MAC address 322A and the second communication protocol MAC address 324A correspond to the same device, namely the computing device 302A.

In FIG. 5, at 506, the system 503 determines that the MAC addresses detected at 504 and 505 correspond to the same device, based on one or more detection methods described above.

Returning to FIG. 4, at step 408, one or more of the systems described herein may store, based on the determination at step 406, correlations between the plurality of first communication protocol MAC addresses and the plurality of second communication protocol MAC addresses. A correlation between a first communication protocol MAC address and a second communication protocol MAC address indicates a single device associated with the first communication protocol MAC address and the second communication protocol MAC address. For example, storing module 208 may, as part of packet analyzer 310 and/or server 306 in FIG. 3, store the correlations 222 in the storage device 220 for each corresponding pair of MAC addresses determined at step 406.

In FIG. 5, at 508 the system 503 stores the correlation determined at 506.

Returning to FIG. 4, at step 410, one or more of the systems described herein may detect a communication on the second communication protocol. For example, detection module 210 may, as part of packet analyzer 310 and/or server 306 in FIG. 3, may detect initiation of the connection 308 by the computing device 302A, directed to the computing device 302B. For example, the packet analyzer 310 may detect a new Bluetooth connection, based on intercepting data packets. The packet analyzer 310 may also detect the corresponding Bluetooth MAC address initiating the connection, as well as the Bluetooth MAC address receiving the connection attempt.

In FIG. 5, at 510 the system 503 detects initiation of a Bluetooth connection by the device 501. The system 503 may also detect the Bluetooth MAC addresses initiating and receiving the Bluetooth connection.

Returning to FIG. 4, at step 412, one or more of the systems described herein may determine, based on at least the stored correlations, whether the detected communication is from an untrusted device For example, second determination module 212 may, as part of packet analyzer 310 and/or server 306 in FIG. 3, determine whether the device initiating the Bluetooth connection, based on the detected Bluetooth MAC address initiating the Bluetooth connection, is not a device spoofing a Bluetooth MAC address of a known or trusted device. In addition, the determination of trusted device or untrusted device may be based on a trust score, such that if weighed factors produce a trust score satisfying a trust threshold, such as 90%, the device may be considered a trusted device.

The second determination module 212 may look up a WiFi MAC address associated with the detected Bluetooth MAC address in the correlations 222. If a corresponding WiFi MAC address is non-existent, the detected Bluetooth MAC address may correspond to an untrusted device, or may be indicative of untrustworthiness (e.g., lowers a trust score). If a corresponding WiFi MAC address exists but is unavailable, for instance the WiFi MAC address is currently not detected on the WiFi network, the detected Bluetooth MAC address may correspond to an untrusted device, or may be indicative of untrustworthiness (e.g., lowers a trust score). However, because a device may not be on WiFi, for example if a user decides not to connect his smartphone to his home WiFi network, the unavailability may not be as strong of an indication of untrustworthiness as non-existence of a WiFi MAC address.

If the corresponding WiFi MAC address is found and is available on the WiFi network, the second determination module 212 may compare a location associated with the detected Bluetooth MAC address with a location associated with the corresponding WiFi MAC address. When the comparison satisfies the location similarity threshold, the device may be a trusted device. In other words, failing to satisfy the location similarity threshold may be indicative of untrustworthiness.

In certain implementations, the second determination module 212 may detect that the corresponding WiFi MAC address, at the same or similar location, disappears from the WiFi network shortly before the Bluetooth connection, or appears soon after the Bluetooth connection. This may not be indicative of trustworthiness because certain smart devices may require connection on one communication protocol, switching to another communication protocol, and switching back to the earlier communication protocol during a setup or configuration process.

In certain implementations, the device itself, such as the computing device 302A, may provide an indication of the detected Bluetooth connection. For example, the application 342A may provide indication of what communication protocols are in use by the computing device 302A and which MAC addresses are associated, in order to verify detected communications and indicate that detected communications are from a trusted device.

In FIG. 5, at 512, the system 503 determines whether the device initiating the Bluetooth connection detected at 510 is a trusted device.

Returning to FIG. 4, at step 414, one or more of the systems described herein may perform a security action when determining the detected communication is from the untrusted device. For example, security action module 214 may, as part of packet analyzer 310 and/or server 306 in FIG. 3, perform a security action as needed to respond to a possible threat from the untrusted device.

Security actions may include generating a notification, for example to a trusted device which may be designated by a user. The security action may include activating an audible alarm, such as an alarm connected to the IoT environment 100. The security action may include activating a visible alarm, such as turning on the light 106, enabling a warning light pattern, or another visual indicator connected to the IoT environment 100. The security action may include disconnecting or disabling a recipient device of the detected communication from the untrusted device, because the recipient device may be compromised. The compromised device may be disconnected from all communication protocols and quarantined. Quarantine may include isolating the compromised device, such as preventing or blocking all communication to or from the compromised device. The security action may include interfering with the detected communication, for instance jamming the associated wireless signals, or disabling the associated wireless network. In certain implementations, untrusted devices and/or compromised devices may be blacklisted, quarantined, or otherwise marked to aid in future determinations of untrustworthiness. In certain implementations, the security actions taken may depend on the trust score, or other factors, including user-defined rules and default rules.

For instance, if the computing device 302A was determined to be untrusted when it attempts to connect to the computing device 302B through the connection 308, security actions may include disabling and/or disconnecting the computing device 302B from the connection 308 and/or the network 304, and preventing the computing device 302A from connecting to other devices in the IoT environment 100.

In FIG. 5, at 514 the system 503 determines that the device 501 is an untrusted device, and correspondingly jams the Bluetooth connection from the device 501. The system 503 also sends a disable command to the compromised device.

The disclosed systems and methods herein provide a way of conferring trust to devices on peer-to-peer connections, such as Bluetooth. Trust may be conferred by connecting a device's Bluetooth MAC address to the device's WiFi MAC address. The MAC addresses may be connected by correlating traffic patterns, correlating device location, and/or an application or app running on the device. Because WiFi requires authentication to join, devices on the WiFi network may be deemed more trustworthy than devices that are not on the WiFi network. Thus, when a Bluetooth connection is detected from a device, if the Bluetooth MAC address of the detected Bluetooth connection has a corresponding known WiFi MAC address, the device may be deemed a trusted device. To prevent spoofing, location may be verified, or an application or app may identify the device's Bluetooth connection as verification.

For example, if a device initiates a Bluetooth connection to a security camera, the disclosed system may determine if the device is also on the WiFi and located where the WiFi device indicates, the device may be trusted. Otherwise, the device is deemed untrusted and an appropriate security action may be taken. The disclosed system may therefore be able to detect untrusted devices connecting to other Bluetooth devices.

Figure 6:
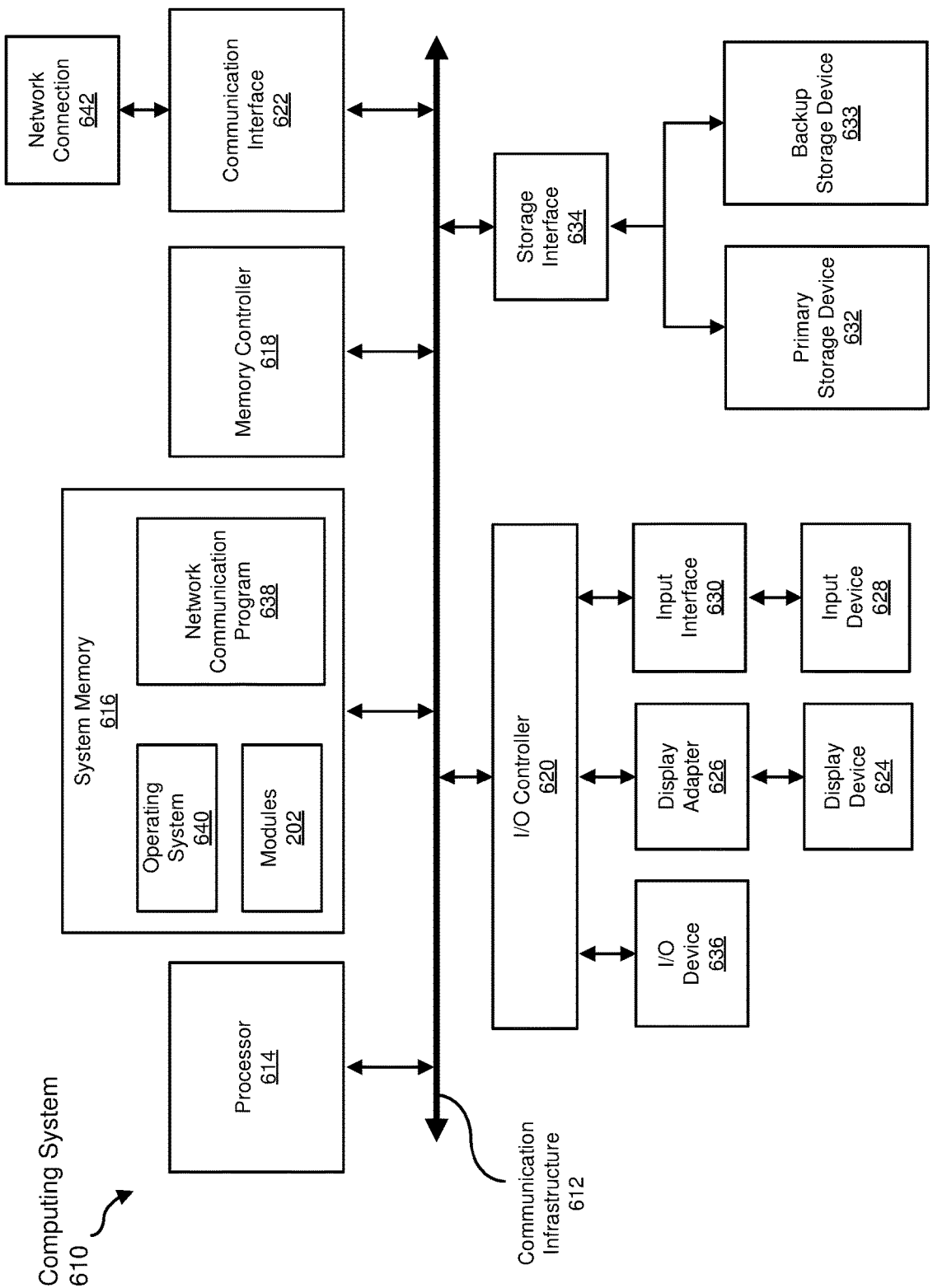
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 202 from FIG. 2 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, correlations 222 from FIG. 2 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
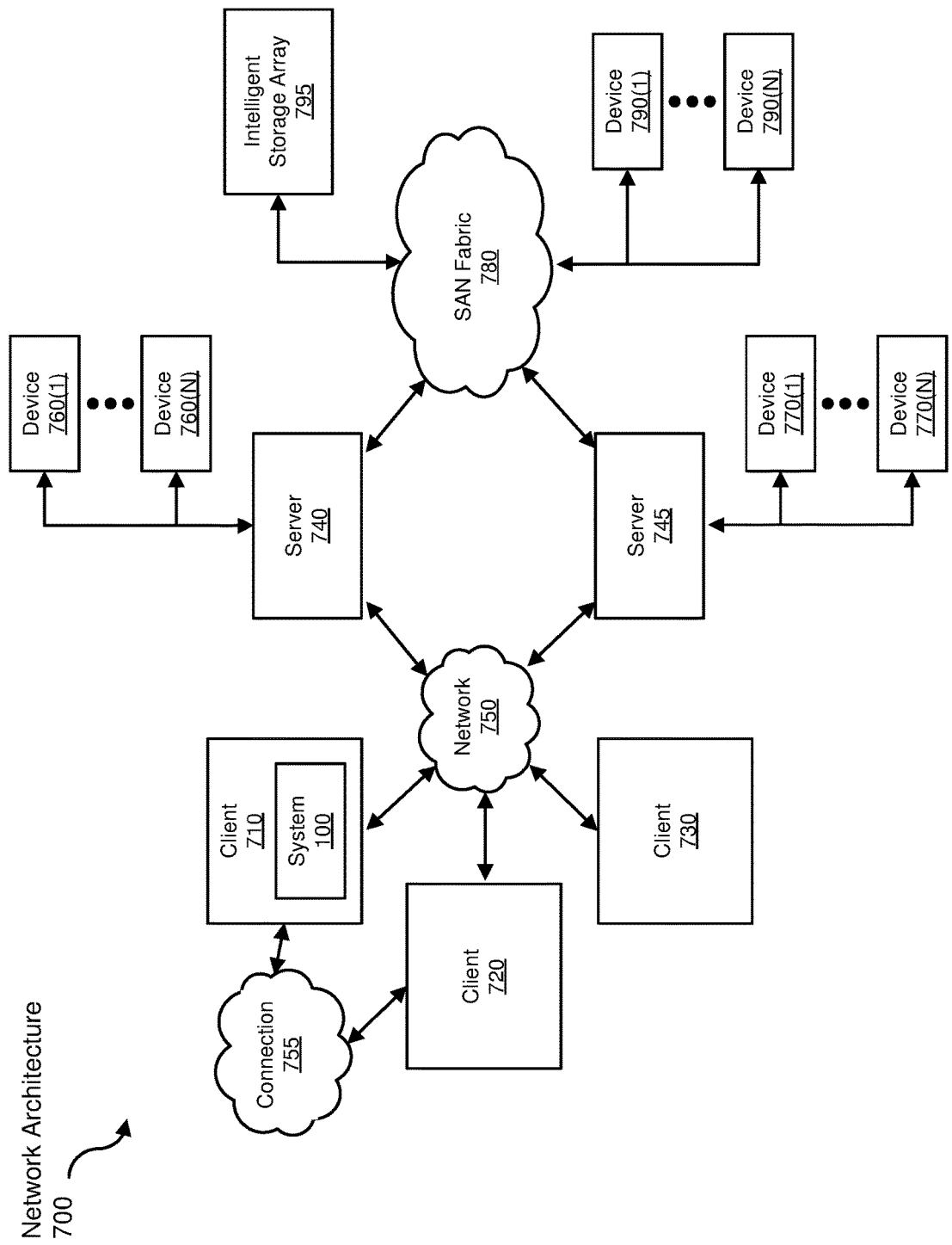
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 200 from FIG. 2.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for identifying untrusted devices in peer-to-peer communication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 200 in FIG. 2 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 200 in FIG. 2 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 200 in FIG. 2 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 200 in FIG. 2 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 200 in FIG. 2 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 200 in FIG. 2 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 200 in FIG. 2 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data packets to be transformed, transform the data packets, use the result of the transformation to determine MAC addresses, and store the result of the transformation to detected untrusted devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying untrusted devices in peer-to-peer communication, at least a portion of the method being performed by a computing device comprising at least one processor, the method comprising:
   collecting, at the computing device, a plurality of first communication protocol media access control (MAC) addresses and a plurality of second communication protocol MAC addresses;
   determining which of the plurality of first communication protocol MAC addresses corresponds to which of the plurality of second communication protocol MAC addresses;
   storing, based on the determination, correlations between the plurality of first communication protocol MAC addresses and the plurality of second communication protocol MAC addresses, wherein a correlation between a first communication protocol MAC address and a second communication protocol MAC address indicates a single device associated with the first communication protocol MAC address and the second communication protocol MAC address;
   detecting a communication on the second communication protocol;

identifying a second communication protocol MAC address of the plurality of second communication protocol MAC addresses corresponding to the detected communication;

identifying, based on the stored correlations, a first communication protocol MAC address associated with the identified second communication protocol MAC address;

determining whether the detected communication is from an untrusted device, wherein determining that the first communication protocol MAC address is unavailable on the first communication protocol indicates that the detected communication is from an untrusted device; and performing a security action when determining the detected communication is from the untrusted device.

2. The method of claim 1, wherein the determining which of the plurality of first communication protocol MAC addresses corresponds to which of the plurality of second communication protocol MAC addresses further comprises:

comparing a data traffic pattern associated with one of the plurality of first communication protocol MAC addresses with a data traffic pattern associated with one of the plurality of second communication protocol MAC addresses; and determining, when the comparison satisfies a traffic similarity threshold, a correlation between the one of the plurality of first communication protocol MAC addresses and the one of the plurality of second communication protocol MAC addresses.

3. The method of claim 1, wherein the determining which of the plurality of first communication protocol MAC addresses corresponds to which of the plurality of second communication protocol MAC addresses further comprises:

comparing a location associated with one of the plurality of first communication protocol MAC addresses with a location associated with one of the plurality of second communication protocol MAC addresses; and determining, when the comparison satisfies a location similarity threshold, a correlation between the one of the plurality of first communication protocol MAC addresses and the one of the plurality of second communication protocol MAC addresses.

4. The method of claim 1, wherein the determining which of the plurality of first communication protocol MAC addresses corresponds to which of the plurality of second communication protocol MAC addresses further comprises:

receiving, from an application running on a device associated with one of the plurality of first communication protocol MAC addresses and one of the plurality of second communication protocol MAC addresses, an indication of a correlation between the one of the plurality of first communication protocol MAC addresses and the one of the plurality of second communication protocol MAC addresses.

5. The method of claim 1, wherein the determining whether the detected communication is from an untrusted device further comprises:

comparing a location associated with the identified second communication protocol MAC address with a location associated with the first communication protocol MAC address; and determining, when the comparison satisfies a location similarity threshold, that the detected communication is from a trusted device.

6. The method of claim 1, wherein the determining whether the detected communication is from an untrusted device further comprises:

receiving, from an application running on a device associated with the identified second communication protocol MAC address, an indication of the detected communication; and determining, based on the indication, that the detected communication is from a trusted device.

7. The method of claim 1, wherein the security action comprises one or more of generating a notification, activating an audible alarm, activating a visible alarm, disconnecting a device associated with the detected communication, or interfering with the detected communication.

8. The method of claim 1, wherein the determining whether the detected communication is from an untrusted device further comprises:

determining a trust score based on one or more weighted factors, wherein the one or more weighted factors include whether the first communication protocol MAC address is unavailable on the first communication protocol; and determining that the detected communication is from the untrusted device when the trust score does not satisfy a trust threshold.

9. A non-transitory computer-readable medium comprising one or more computer-executable instructions that, when executed by at least one processor of a computing device, cause the computing device to:

collect, at the computing device, a plurality of first communication protocol media access control (MAC) addresses and a plurality of second communication protocol MAC addresses;

determine which of the plurality of first communication protocol MAC addresses corresponds to which of the plurality of second communication protocol MAC addresses;

store, based on the determination, correlations between the plurality of first communication protocol MAC addresses and the plurality of second communication protocol MAC addresses, wherein a correlation between a first communication protocol MAC address and a second communication protocol MAC address indicates a single device associated with the first communication protocol MAC address and the second communication protocol MAC address;

detect a communication on the second communication protocol;

identify a second communication protocol MAC address of the plurality of second communication protocol MAC addresses corresponding to the detected communication;

identify, based on the stored correlations, a first communication protocol MAC address associated with the identified second communication protocol MAC address;

determine whether the detected communication is from an untrusted device, wherein determining that the first communication protocol MAC address is unavailable on the first communication protocol indicates that the detected communication is from an untrusted device; and perform a security action when determining the detected communication is from the untrusted device.

10. The computer-readable medium of claim 9, wherein the determining which of the plurality of first communication protocol MAC addresses corresponds to which of the plurality of second communication protocol MAC addresses further comprises:
  comparing a data traffic pattern associated with one of the plurality of first communication protocol MAC addresses with a data traffic pattern associated with one of the plurality of second communication protocol MAC addresses; and
  determining, when the comparison satisfies a traffic similarity threshold, a correlation between the one of the plurality of first communication protocol MAC addresses and the one of the plurality of second communication protocol MAC addresses.

11. The computer-readable medium of claim 9, wherein the determining which of the plurality of first communication protocol MAC addresses corresponds to which of the plurality of second communication protocol MAC addresses further comprises:
  comparing a location associated with one of the plurality of first communication protocol MAC addresses with a location associated with one of the plurality of second communication protocol MAC addresses; and
  determining, when the comparison satisfies a location similarity threshold, a correlation between the one of the plurality of first communication protocol MAC addresses and the one of the plurality of second communication protocol MAC addresses.

12. The computer-readable medium of claim 9, wherein the determining which of the plurality of first communication protocol MAC addresses corresponds to which of the plurality of second communication protocol MAC addresses further comprises:
  receiving, from an application running on a device associated with one of the plurality of first communication protocol MAC addresses and one of the plurality of second communication protocol MAC addresses, an indication of a correlation between the one of the plurality of first communication protocol MAC addresses and the one of the plurality of second communication protocol MAC addresses; and
  wherein the determining whether the detected communication is from an untrusted device further comprises:
  identifying a second communication protocol MAC address of the plurality of second communication protocol MAC addresses corresponding to the detected communication, wherein the identified second communication protocol MAC address is associated with the device;
  receiving, from the application running on the device, an indication of the detected communication; and
  determining, based on the indication, that the detected communication is from a trusted device.

13. The computer-readable medium of claim 9, wherein the determining whether the detected communication is from an untrusted device further comprises:
  comparing a location associated with the identified second communication protocol MAC address with a location associated with the first communication protocol MAC address; and
  determining, when the comparison satisfies a location similarity threshold, that the detected communication is from a trusted device.

14. The computer-readable medium of claim 9, wherein the determining whether the detected communication is from an untrusted device further comprises:
  determining a trust score based on one or more weighted factors, wherein the one or more weighted factors include whether the first communication protocol MAC address is unavailable on the first communication protocol; and
  determining that the detected communication is from the untrusted device when the trust score does not satisfy a trust threshold.

15. A system for identifying untrusted devices in peer-to-peer communication, the system comprising:
  a memory;
  a collection module, stored in the memory, configured to collect a plurality of first communication protocol media access control (MAC) addresses and a plurality of second communication protocol MAC addresses;
  a first determination module, stored in the memory, configured to determine which of the plurality of first communication protocol MAC addresses corresponds to which of the plurality of second communication protocol MAC addresses;
  a storing module, stored in the memory, configured to store, based on the determination, correlations between the plurality of first communication protocol MAC addresses and the plurality of second communication protocol MAC addresses, wherein a correlation between a first communication protocol MAC address and a second communication protocol MAC address indicates a single device associated with the first communication protocol MAC address and the second communication protocol MAC address;
  a detection module, stored in the memory, configured to detect a communication on the second communication protocol;
  a second determination module, stored in the memory, configured to:
    identify a second communication protocol MAC address of the plurality of second communication protocol MAC addresses corresponding to the detected communication;
    identify, based on the stored correlations, a first communication protocol MAC address associated with the identified second communication protocol MAC address;
    determine whether the detected communication is from an untrusted device, wherein determining that the first communication protocol MAC address is unavailable on the first communication protocol indicates that the detected communication is from an untrusted device;
  a security action module, stored in the memory, configured to perform a security action when determining the detected communication is from the untrusted device; and
  at least one physical processor configured to execute the collection module, the first determination module, the storing module, the detection module, the second determination module, and the security action module.

16. The system of claim 15, wherein the first determination module is further configured to:
  compare a data traffic pattern associated with one of the plurality of first communication protocol MAC addresses with a data traffic pattern associated with one of the plurality of second communication protocol MAC addresses; and
  determine, when the comparison satisfies a traffic similarity threshold, a correlation between the one of the plurality of first communication protocol MAC addresses and the one of the plurality of second communication protocol MAC addresses.

17. The system of claim 15, wherein the first determination module is further configured to:
compare a location associated with one of the plurality of first communication protocol MAC addresses with a location associated with one of the plurality of second communication protocol MAC addresses; and
determine, when the comparison satisfies a location similarity threshold, a correlation between the one of the plurality of first communication protocol MAC addresses and the one of the plurality of second communication protocol MAC addresses.

18. The system of claim 15, wherein the first determination module is further configured to:
receive, from an application running on a device associated with one of the plurality of first communication protocol MAC addresses and one of the plurality of second communication protocol MAC addresses, an indication of a correlation between the one of the plurality of first communication protocol MAC addresses and the one of the plurality of second communication protocol MAC addresses; and
wherein the second determination module is further configured to:
receive, from the application running on the device, an indication of the detected communication; and
determine, based on the indication, that the detected communication is from a trusted device.

19. The system of claim 15, wherein the second determination module is further configured to:
compare a location associated with the identified second communication protocol MAC address with a location associated with a first communication protocol MAC address corresponding to the identified second communication protocol MAC address; and
determine, when the comparison satisfies a location similarity threshold, that the detected communication is from a trusted device.

20. The system of claim 15, wherein the second determination module is further configured to:
determine a trust score based on one or more weighted factors, wherein the one or more weighted factors include whether the first communication protocol MAC address is unavailable on the first communication protocol; and
determine that the detected communication is from the untrusted device when the trust score does not satisfy a trust threshold.

\* \* \* \* \*